(12) United States Patent
Kammel et al.

(10) Patent No.: US 8,473,187 B2
(45) Date of Patent: Jun. 25, 2013

(54) METHOD AND APPARATUS FOR COMBINING THREE-DIMENSIONAL POSITION AND TWO-DIMENSIONAL INTENSITY MAPPING FOR LOCALIZATION

(75) Inventors: Soeren Kammel, San Jose, CA (US); Benjamin Pitzer, Menlo Park, CA (US); Jan Becker, Palo Alto, CA (US); Charles DuHadway, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 580 days.

(21) Appl. No.: 12/475,701

(22) Filed: Jun. 1, 2009

(65) Prior Publication Data
US 2010/0305854 A1 Dec. 2, 2010

(51) Int. Cl.
*G01C 21/00* (2006.01)
(52) U.S. Cl.
USPC .......................................................... 701/213
(58) Field of Classification Search
USPC .......................................................... 701/213
See application file for complete search history.

(56) References Cited

U.S. PATENT DOCUMENTS

| | | | |
|---|---|---|---|
| 6,009,359 A * | 12/1999 | El-Hakim et al. | 701/28 |
| 6,650,324 B1 | 11/2003 | Junkins | |
| 7,363,157 B1 * | 4/2008 | Hanna et al. | 702/5 |
| 2006/0061566 A1 * | 3/2006 | Verma et al. | 345/419 |
| 2006/0164412 A1 * | 7/2006 | Dupont et al. | 345/419 |
| 2008/0033645 A1 | 2/2008 | Levinson et al. | |
| 2009/0033540 A1 | 2/2009 | Breed et al. | |
| 2010/0305854 A1 * | 12/2010 | Kammel et al. | 701/213 |

FOREIGN PATENT DOCUMENTS

| | | |
|---|---|---|
| EP | 1 677 076 A2 | 7/2006 |
| WO | WO 2007 051972 A1 | 5/2007 |

OTHER PUBLICATIONS

Levinson et al., Map-Based Precision Vehicle Localization in Urban Environments; Stanford Artificial Intelligence Laboratory; 8 pages.
Lepetit and Fua, Keypoint Recognition Using Randomized Trees; Ecole Polytechnique Federale de Lausanne (EPFL), Computer Vision Laboratory, I&C Faculty, CH-1015 Lausanne, Switzerland; draft Aug. 17, 2006—To appear in IEEE PAMI; 27 pages.
Se, Lowe and Little, Members IEEE; Vision-Based Global Localization and Mapping for Mobile Robots; IEEE Transactions on Robotics, vol. 21, No. 3, Jun. 2005, pp. 364-375 (12 pages).
Valgren and Lilienthal; SIFT, SURF and Seasons: Long-term Outdoor Localization Using Local Features; Applied Autonomous Sensor Systems, Orebro University, SE-70182 Orebro, Sweden; 6 pages.
Calonder, Lepetit and Fua; Keypoint Signatures for Fast Learning and Recognition; Computer Vision Laboratory, EPFL, Switzerland; ECCV 2008, Part I, LNCS 5302, pp. 58-71; Springer-Verlag Berlin Heidelberg 2008; 14 pages.
Scaramuzza, Criblez, Martinelli and Siegwart; "Robust Feature Extraction and Matching for Omnidirectional Images"; document not dated; 11 pages; Authors: Swiss Federal Institute of Technology Zurich, IEEE; This work was conducted within the EU Integrated Projects COGNIRON (The Cognitive Robot Companion) and BACS (Bayesian Approach to Cognitive Systems).

* cited by examiner

*Primary Examiner* — Sheetal R Rangrej

(57) ABSTRACT

A mapping method includes using a first mobile unit to map two-dimensional features while the first mobile unit traverses a surface. Three-dimensional positions of the features are sensed during the mapping. A three-dimensional map is created including associations between the three-dimensional positions of the features and the map of the two-dimensional features. The three-dimensional map is provided from the first mobile unit to a second mobile unit. The second mobile unit is used to map the two-dimensional features while the second mobile unit traverses the surface. Three-dimensional positions of the two-dimensional features mapped by the second mobile unit are determined within the second mobile unit and by using the three-dimensional map.

20 Claims, 7 Drawing Sheets

METHOD AND APPARATUS FOR COMBINING THREE-DIMENSIONAL POSITION AND TWO-DIMENSIONAL INTENSITY MAPPING FOR LOCALIZATION

BACKGROUND OF THE INVENTION

1. Field of the Invention

The present invention relates to mapping techniques, and, more particularly, to mapping techniques that are used in localization systems.

2. Description of the Related Art

Autonomous vehicles as well as personal vehicles have to operate safely in a human environment. Such vehicles are employed in the fields of driver assistance systems, systems for autonomous driving, mobile robotics and personal robotics. In order to operate safely, accurate perception of the environment and accurate localization within the environment is required. The perceived two-dimensional and three-dimensional data is used in a mapping process in order to represent the environment in the localization step.

Current sensor systems for three-dimensional perception typically use laser range finders, stereo cameras or three-dimensional range imagers. These sensors are typically very expensive and demanding in terms of computational processing power for signal processing.

Inexpensive localization systems based on, for example, ultrasonic sensors or mono vision have to make assumptions about the structure of the environment in which they are intended to be deployed. Thus, such inexpensive localization systems are generally applicable to only the simplest of environments or they suffer from low robustness caused by violations of the model assumptions.

What is neither disclosed nor suggested in the art is a mapping method that overcomes the above-described problems with known mapping methods.

SUMMARY OF THE INVENTION

The present invention provides a method for mapping of robust two-dimensional intensity features in association with their precise three-dimensional position for highly accurate and low cost localization systems. The intensity features may be obtained, for example, via Scale-Invariant Feature Transform (SIFT), Speeded Up Robust Features (SURF), Le Petit Poucet GPS software or Calonder. The precise three-dimensional position may be obtained by a calibrated Light Detection and Ranging (LIDAR) system, for example.

The present invention, in order to enable low-cost localization, may utilize maps created with a hardware setup including a three-dimensional sensor (e.g., LIDAR), a two-dimensional intensity sensor (e.g., a camera), and possibly a positioning sensor (e.g. a dead-reckoning system) if global coordinates are desired. A novel feature of the present invention is the association of two-dimensional intensity features with their three-dimensional position in the map. The actual localization for vehicles/robots different from the mapping system can then be performed safely with a low-cost monoscopic intensity sensor.

The invention comprises, in one form thereof, a mapping method including using a first mobile unit to map two-dimensional features while the first mobile unit traverses a surface. Three-dimensional positions of the features are sensed during the mapping. A three-dimensional map is created including associations between the three-dimensional positions of the features and the map of the two-dimensional features. The three-dimensional map is provided from the first mobile unit to a second mobile unit. The second mobile unit is used to map the two-dimensional features while the second mobile unit traverses the surface. Three-dimensional positions of the two-dimensional features mapped by the second mobile unit are determined within the second mobile unit and by using the three-dimensional map.

The invention comprises, in another form thereof, a mapping arrangement including a first mobile unit having a first intensity field sensor for mapping two-dimensional features while the first mobile unit traverses a surface. A three-dimensional position sensing device senses the three-dimensional positions of the features during the mapping by the intensity field sensor. A processor is in communication with both the intensity field sensor and the three-dimensional position sensing device. The processor creates a three-dimensional map including associations between the three-dimensional positions of the features and the map of the two-dimensional features. A transmitting device is in communication with the processor and transmits the three-dimensional map. A second mobile unit includes a receiving device for receiving the three-dimensional map from the first mobile unit. A second intensity field sensor maps the two-dimensional features while the second mobile unit traverses the surface. A processor is in communication with both the intensity field sensor and the receiving device. The processor determines three-dimensional positions of the two-dimensional features mapped by the second mobile unit. The determining of the three-dimensional positions is performed within the second mobile unit and by using the three-dimensional map.

The invention comprises, in yet another form thereof, a mapping method including mapping two-dimensional features of a roadway. Three-dimensional positions of the features are sensed during the mapping. Global position coordinates of the roadway are determined. A three-dimensional map is created including associations between the three-dimensional positions of the features, the map of the two-dimensional features, and the global position coordinates. The three-dimensional map is provided to a motor vehicle. The vehicle is used to map the two-dimensional features while the vehicle traverses the roadway. Global position coordinates of the vehicle are tracked while the motor vehicle traverses the roadway. The global position coordinates of the vehicle are matched to the global position coordinates associated with the three-dimensional map. The two-dimensional features associated with the matched global position coordinates are also matched. Distances between the vehicle and the two-dimensional features mapped by the vehicle are determined within the vehicle and by using the three-dimensional positions associated with the matched two-dimensional features.

An advantage of the present invention is that a single mapping device enables an arbitrary number of robots/vehicles to safely and accurately navigate in the mapped area.

Another advantage is that, due to the integration of potential mass production components, there is the potential of significant cost reductions compared to currently developed systems for mapping and localization.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
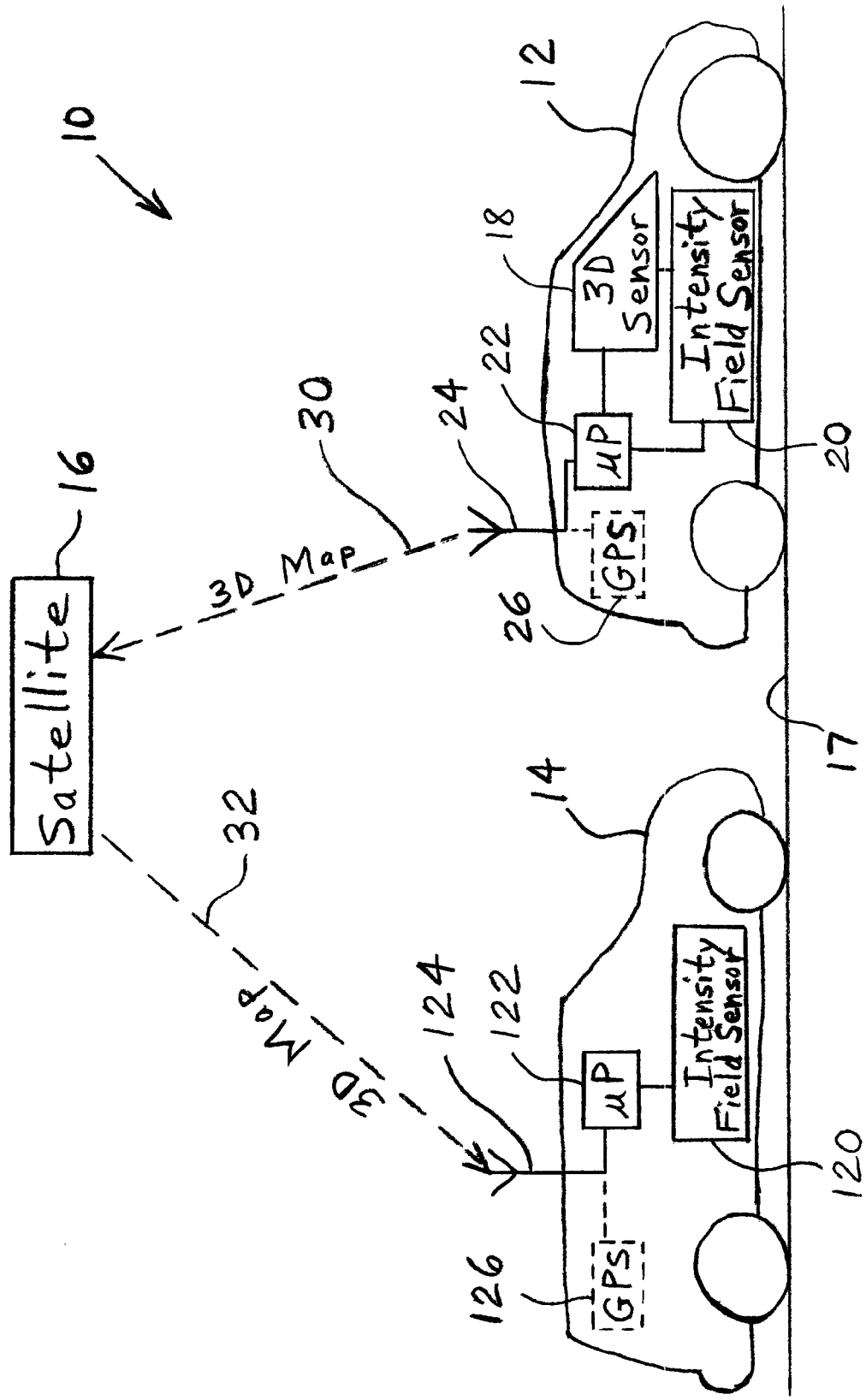
FIG. 1 is a diagram illustrating one embodiment of a localization arrangement of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring now to the drawings, and particularly to FIG. 1, there is shown one embodiment of a localization arrangement 10 of the present invention including a first vehicle 12, and a second vehicle 14 in communication via a satellite 16. Both vehicles 12 and 14 travel on a roadway 17. Vehicle 12 includes a three-dimensional sensor 18, an intensity field sensor 20, a processor 22, an antenna 24 and an optional global positioning system (GPS) 26. Three-dimensional sensor 18 may be in the form of a LIDAR system or stereo camera, for example. The LIDAR system may simultaneously be employed in an adaptive cruise control (ACC) system of vehicle 12. Intensity field sensor 20 may be in the form of a camera in one embodiment. Processor 22 may be any standard microprocessor.

Vehicle 14 includes an intensity field sensor 120, a processor 122, an antenna 124 and an optional GPS 126. Intensity field sensor 120 may be in the form of a camera in one embodiment. Processor 122 may be any standard microprocessor. Satellite 16 may be any standard satellite used in GPS communication. Although intensity field sensors 20, 120 and 3D sensor 18 are shown in FIG. 1 as being in the middle portion of the vehicles, any of these sensors may be advantageously installed in the front bumper of its respective vehicle for an unobstructed field of view.

According to a three-dimensional mapping method of the present invention, three-dimensional sensor 18 is combined with intensity field sensor 20 and is possibly supported by a positioning device such as a dead-reckoning system in the form of GPS 26. A system for mapping road surfaces may include high-end LIDAR, GPS and Inertial Measurement Unit (IMU) sensors. The system may produce a two-dimensional surface image of ground reflectivity with five centimeter resolution of the road surface. In one embodiment of the invention, this system is extended to create a three-dimensional surface mesh.

Figure 2A:
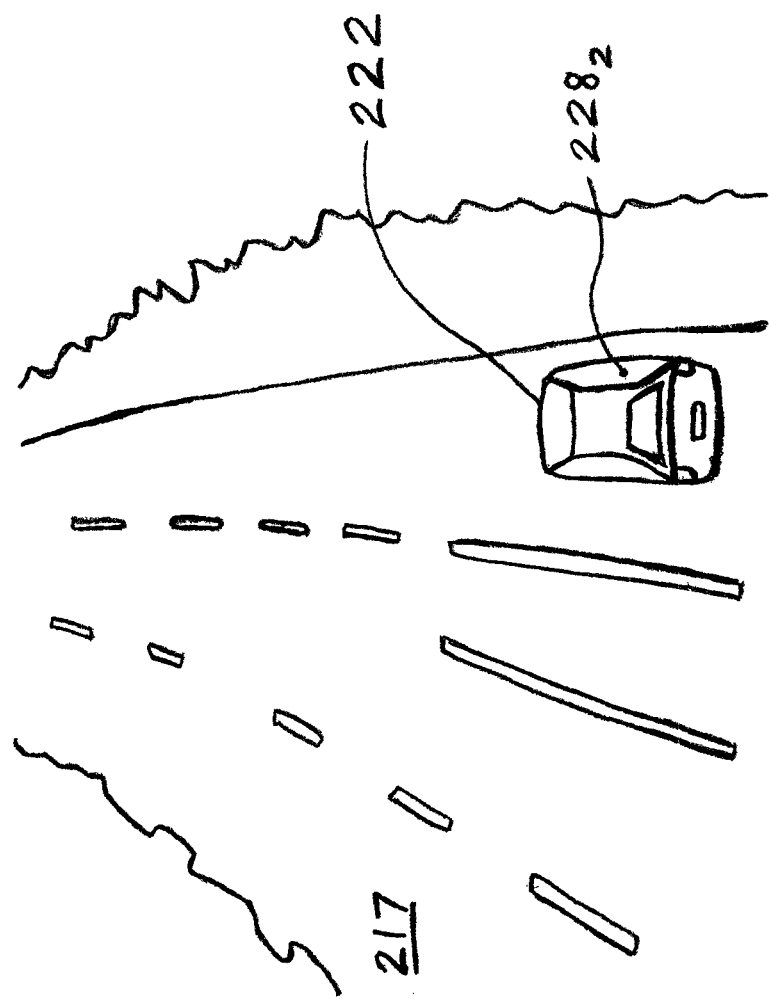
FIG. 2a is an example of a two-dimensional map created by an intensity field sensor of the FIG. 1 which may also include three-dimensional information.

FIG. 2a illustrates an example of a two-dimensional map created by intensity field sensor 20 that may include three-dimensional information as provided by a LIDAR sensor. The scanning processing may lay out in a grid-like structure the three-dimensional data points that make up a three-dimensional map. Each point in space may be represented by a distance value associated with two angles of the laser beam.

Figure 2B:
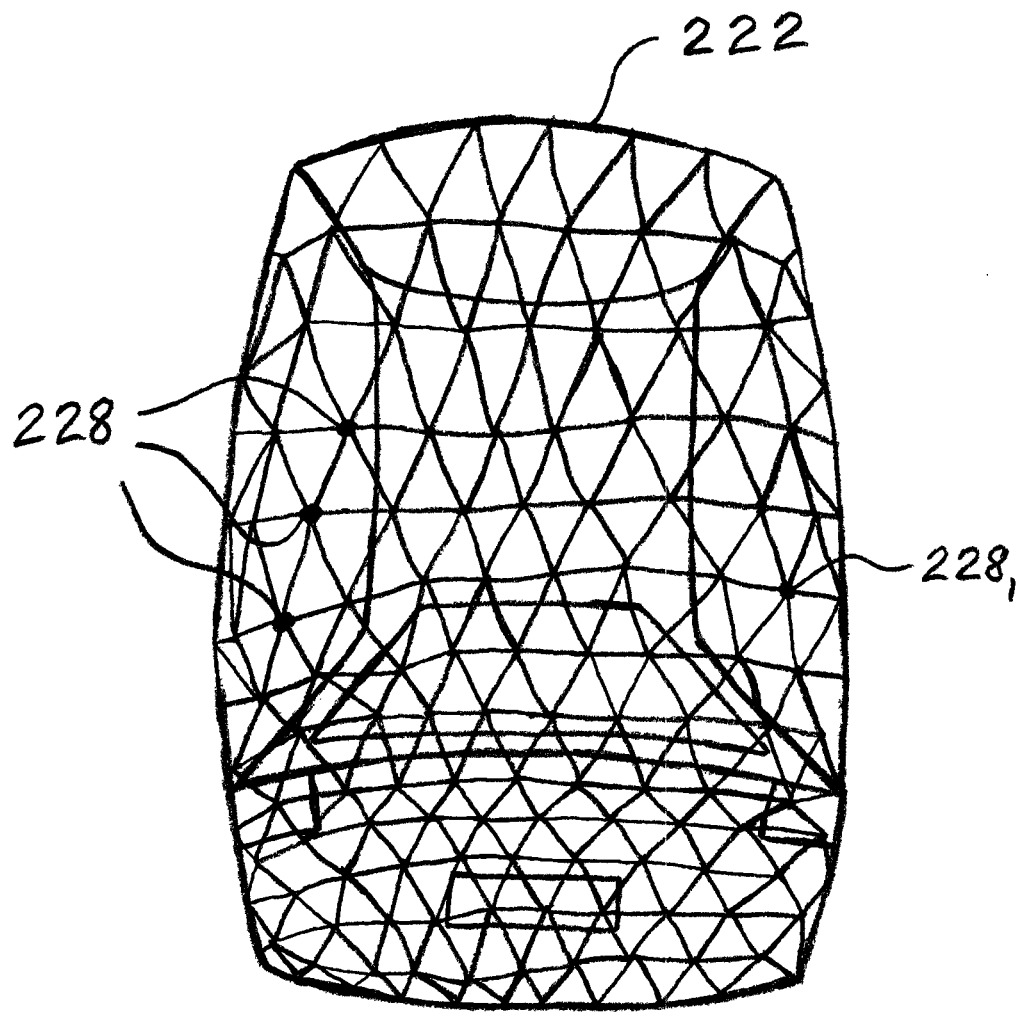
FIG. 2b is an enlarged view of the vehicle of FIG. 2a illustrating three-dimensional information included therein.

FIG. 2b is an enlarged view of vehicle 222 of FIG. 2a. As illustrated in FIG. 2b, a triangle mesh, or "3D surface mesh," can be created by connecting each data point with two of its neighbors in each angular direction. Three such data points 228 are identified in FIG. 2b for the purpose of illustration. The 3D surface mesh is comprised of triangle faces wherein trios of adjacent data points 228 are connected to create a coarse approximation of a more complex three-dimensional surface.

According to a feature association process of the present invention, the two-dimensional intensity field sensor 20 is aligned with three-dimensional sensor 18. Thus, additional features, such as those obtained via SIFT, for example, may be recorded, associated with their three-dimensional position, and stored in the map. These additional features may be easy to detect even by low-cost camera systems.

Figure 3:
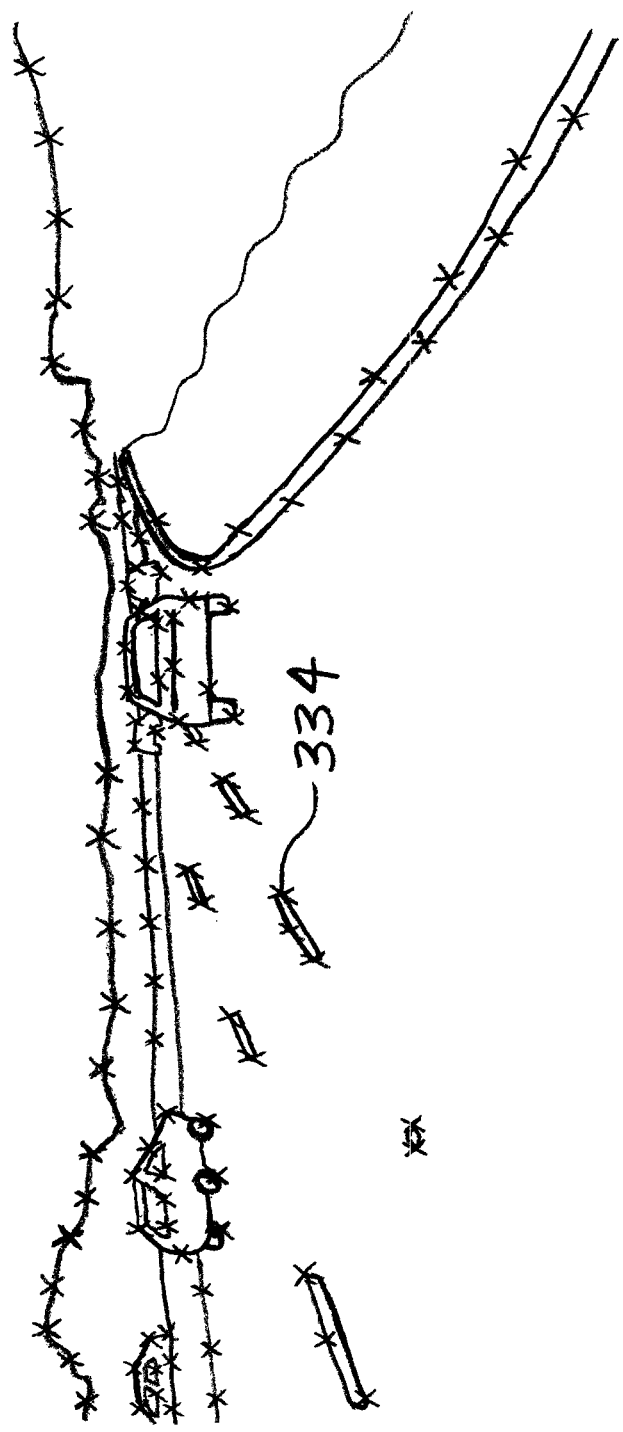
FIG. 3 is an example of a mapping created via one embodiment of a mapping method of the present invention.

Illustrated in FIG. 3 is an example of robust two-dimensional intensity features being associated with their three-dimensional position in the mapping process of the present invention. In FIG. 3, a small "x" denotes features that are associated with their three-dimensional positions and stored in a map. Typically a greater number of features are associated and stored than are shown in FIG. 3. However, a lesser number of features are denoted in FIG. 3 for clarity of illustration.

According to the invention, the map of FIG. 3 may be used for localization of another vehicle, such as vehicle 14 (FIG. 1). More particularly, the three-dimensional map of FIG. 3 may be uploaded from vehicle 12 to satellite 16, as indicated by arrow 30 in FIG. 1, and then may be downloaded from satellite 16 to vehicle 14, as indicated by arrow 32.

For the localization of another robot/vehicle such as vehicle 14 on the previously created map of FIG. 3, intensity field sensor 120 may be in the form of a low-cost monoscopic intensity sensor. Sensor 120 may be combined with an off-the-shelf GPS receiver 126 for initialization. The position of a car/robot such as vehicle 14 equipped with the two-dimensional intensity field sensor 120 may be obtained from the three-dimensional positions associated with the found matches that are indicated by the small x's in FIG. 3.

In the particular embodiment illustrated in FIGS. 1-3, first vehicle 12 may use intensity field sensor 20 to collect two-dimensional data, and vehicle 12 may use 3D sensor 18 to collect three-dimensional data. The two-dimensional data may be stored in association with the three-dimensional data in the form of a stored 3D map, as shown in FIG. 3. The 3D map, as well as other 3D maps produced by vehicle 12, may be uploaded to satellite 16. The 3D map may be stored and uploaded in association with the global geographic coordinates of vehicle 12, as determined by GPS module 26.

The 3D map created by vehicle 12 may then be used by other vehicles, such as vehicle 14, to identify the distances between vehicle 14 and certain landmarks and/or markings in the roadway. In one embodiment, satellite 16 downloads to vehicle 14 3D maps that were collected by vehicle 12 when vehicle 12 was at approximately the same GPS coordinates that vehicle 14 is at presently. In a specific embodiment, vehicle 14 transmits its present GPS coordinates to satellite 16, and satellite 16 downloads to vehicle 14 the 3D map from vehicle 12 that satellite 16 has stored in association with approximately the same GPS coordinates.

In another embodiment, processor 122 has access to a larger portion of the 3D map than merely the portion corresponding to its present GPS coordinates. In this case, processor 122 may use the current global position coordinates of vehicle 14 to identify a corresponding portion of the three-dimensional map.

Having received the 3D map approximately corresponding to its current global geographic coordinates, processor 122 of vehicle 14 may match up the data collected by intensity field sensor 120 with the two-dimensional data in the received 3D map. For example, processor 122 may use edge detection or other image processing techniques to match up a data point such as data point 334 (FIG. 3), or a group of data points including data point 334, with a data point or group of data points collected by intensity field sensor 120. More generally, processor 122 may match up a group of data points collected by intensity field sensor 120 with a group of two-dimensional data points in the received 3D map. Having matched up groups of data points collected by intensity field sensor 120 and in the 3D map, processor 122 may then match up smaller groups of data points, or even individual data points, collected by intensity field sensor 120 and in the 3D map.

After finding a 2D data point, or group of 2D data points, in the data collected by sensor 120 that corresponds to point 334 in the 3D map, processor 122 may then determine the distance and possibly the direction between vehicle 14 and the 2D data point(s) that correspond(s) to point 334. That is, processor 122 may use the 3D map to determine the distance and direction between vehicle 12 and point 334. Processor 122 may then use that determined distance and direction between vehicle 12 and point 334 as a proxy for the distance and direction between vehicle 14 and the data collected by sensor 120 corresponding to point 334. Processor 122 may then use that estimated distance in a variety of potential applications, such as automatic steering and/or collision avoidance algorithms.

In the embodiment of FIG. 1, satellite 16 is shown as receiving the three-dimensional map and relaying it to another vehicle. However, in another embodiment, satellite 16 is used only to enable the vehicles to determine their global coordinates. The three-dimensional map is transmitted via radio frequency to a terrestrial central office which then relays the three-dimensional map to other vehicles via radio frequency. In another embodiment, the three-dimensional map is stored on a memory device in the vehicle that creates the map. The memory device may then be transferred to another vehicle, or the contents of the memory device may be copied to the other vehicle.

Figure 4:
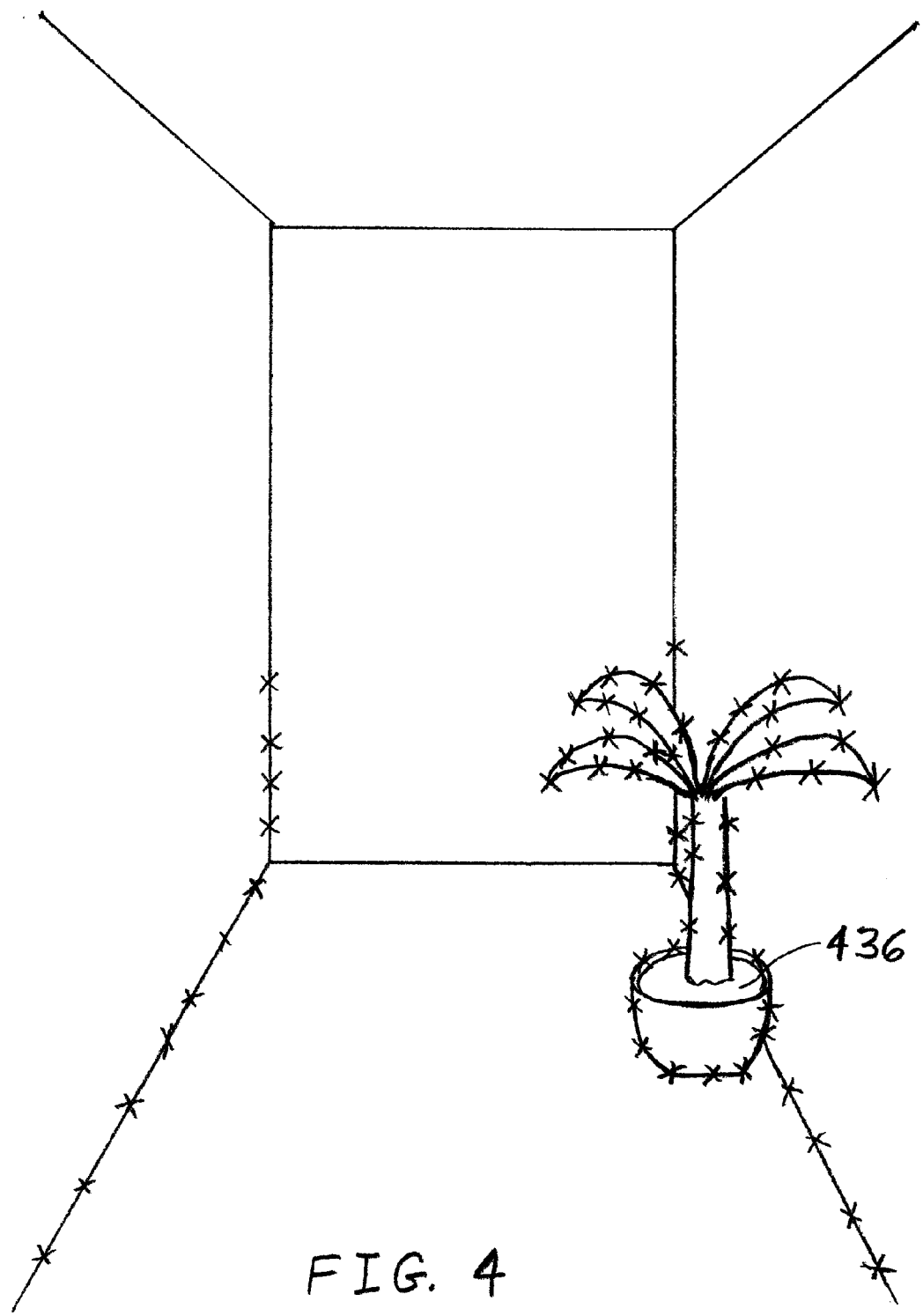
FIG. 4 is an example of a mapping created via another embodiment of a mapping method of the present invention.

The invention is described in FIGS. 1-3 as being applied to a motor vehicle traveling while being surrounded by a dynamic and constantly changing traffic environment (i.e., other moving vehicles). However, the invention is also applicable to use by robots or other types of moving vehicles that operate in a primarily static environment, such as a robotic lawn mower or robotic vacuum cleaner. For example, FIG. 4 illustrates a 3D map of a hallway created by a robot vacuum cleaner. Instead of mapping moving things such as motor vehicles, the robotic vacuum cleaner may create a 3D map of fixtures and relatively stationary objects such as potted plant 436. This 3D map may be used by the same vacuum cleaner that created the 3D map, or by a different vacuum cleaner, in navigating its vacuuming of the hallway.

In one embodiment, the 3D map is created by a robot specifically provided for the purpose of creating 3D maps. Regardless of whether created by a dedicated robot or by a different vacuum cleaner, the 3D map may be electronically transferred directly from the map-creating entity to the vacuum cleaner that uses the 3D map. The transfer of the 3D map may be performed wirelessly, or via a hard wired connection between the map-creating entity and the vacuum cleaner that uses the 3D map.

In one embodiment, the vacuum cleaner that vacuums the hallway includes an intensity field sensor that collects two-dimensional image data of the hallway shown in FIG. 4.

Rather than using a GPS to determine the present location of the vacuum cleaner, the processor of the vacuum cleaner may keep track of its location relative to the last landmark identified and passed by the vacuum cleaner. For example, the wheels of the vacuum cleaner may be driven by a stepper motor, and the processor may keep track of the number of rotations of the stepper motor since the immediately previous landmark was sensed. This number of stepper motor rotations may be stored in association with corresponding two-dimensional image data that is collected.

As in the previous embodiment of FIGS. 1-3, the two-dimensional image data of the hallway may be compared to the two-dimensional data of the 3D map. When a matching group of two-dimensional data is identified, the three-dimensional data of the 3D map corresponding to the matching group of two-dimensional data may be extracted by the vacuum cleaner. The vacuum cleaner may use the three-dimensional data of the 3D map to determine distances and directions between the vacuum cleaner and landmarks (e.g., a corner of a wall or a door frame) and obstacles (e.g., potted plant 436) in the area to be vacuumed. The vacuum cleaner may steer itself or otherwise navigate the mapped area in order to avoid collisions with the obstacles and also to plan its route to most efficiently cover the entire area to be vacuumed.

In another embodiment, the vacuum cleaner that creates the three-dimensional map is operated and steered by a human operator, and the resulting three-dimensional map is utilized by a robotic vacuum cleaner that requires no human operation. The invention is applicable to other applications, such as lawn mowers, where the first pass to create the three-dimensional map is performed under human guidance, and subsequent passes using the three-dimensional map employ automatic navigation with no human input.

In one specific embodiment, the method of the invention is applied to navigation guidance. The invention may enable a vehicle with merely a low-cost camera system to perform lane-precise localization relative to the pre-recorded map. State-of-the-art in-car navigation systems provide only absolute driving suggestions (e.g., "change to second") without reference to the current position of the vehicle. In contrast, the increased localization accuracy of the present invention enables the current vehicle position to be referenced in a more natural interaction in the form of "change to lane left of you."

In another specific embodiment, the method of the invention provides increased robustness of navigation. State-of-the-art navigation systems based on GPS suffer from multipath errors and loss of reception in tunnels and "city-canyons." In order to overcome this problem, odometry sensors are used for short-term stabilization. However, if GPS reception is insufficient or unavailable for several minutes, localization accuracy decreases dramatically due to drift errors. Because the localization method of the present invention does not require substantially continuous communication with a satellite, and exhibits an improved drift characteristic, the time period of safe (i.e., localized) driving without GPS can be extended dramatically.

In yet another specific embodiment, the method of the invention is applied to personal robotics. Robotic applications of the invention include indoor surveillance, lawn mowing, transportation in industrial environments, and house cleaning. Common to these applications is that their environment (e.g., office, garden, house, factory, warehouse) does not change rapidly. Therefore, mapping may be required only a few times per year (e.g., by companies offering mapping services or renting mapping equipment). The mapping may enable everyday localization for possibly several robots.

The association and mapping of three-dimensional landmarks, as provided by the present invention, may be advantageous over pure two-dimensional image features since the three-dimensional position is directly accessible from the three-dimensional map. Thus, no ground plane assumption is required, and no computationally-expensive structure-from-motion methods have to be employed.

In still another specific embodiment, the method of the invention provides a low-cost system for personal robotics. Applications in this field include tasks around the house, such as dish washing, placing objects in their designated places, washing and drying clothes, and house cleaning. Other applications serve the aging population, such as carrying heavy things, remembering where things are, retrieving items, preparing food, and body washing. Yet other applications assist people with disabilities, such as by telemanipulation, feeding, doing chores, and monitoring health and activity. Still other applications involve business operations, such as pick and pack, stocking grocery stores, tracking inventory, retrieving items, and maintaining a searchable physical file system.

Figure 5:
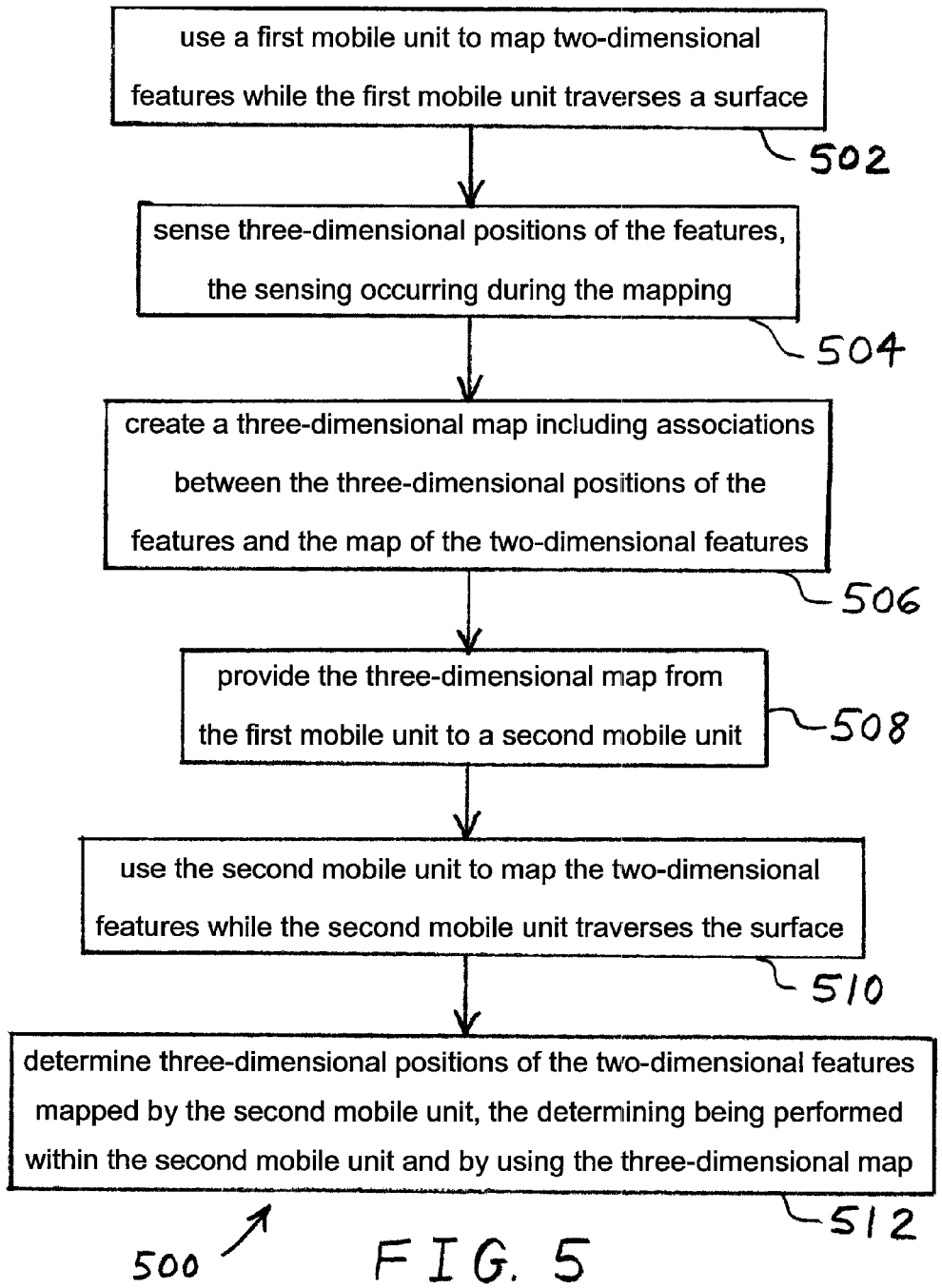
FIG. 5 is a flow chart of an embodiment of a mapping method of the present invention.

One embodiment of a mapping method 500 of the present invention is illustrated in FIG. 5. In a first step 502, a first mobile unit is used to map two-dimensional features while the first mobile unit traverses a surface. For example, a mobile unit in the form of vehicle 12 (FIG. 1) may include an intensity field sensor 20 that maps the two-dimensional features shown in FIG. 2*a* while vehicle 12 traverses a roadway 217.

In a second step 504, three-dimensional positions of the features are sensed, the sensing occurring during the mapping. For example, vehicle 12 may include a three-dimensional sensor such as 3D sensor 18, and this 3D sensor 18 may sense the distances between the features and vehicle 12 during the mapping performed by intensity field sensor 20.

In step 506, a three-dimensional map is created including associations between the three-dimensional positions of the features and the map of the two-dimensional features. For example, a three-dimensional map such as shown in FIG. 2*b* may be created, and the mapping may include stored associations between each of the data points 228 and respective points on the two-dimensional map of FIG. 2*a*. For example, the three-dimensional position of data point 228₁ in the three-dimensional map of FIG. 2*b* may be stored in association with point 228₂ of the two-dimensional map of FIG. 2*a*.

In a next step 508, the three-dimensional map from the first mobile unit is provided to a second mobile unit. For example, as shown in FIG. 1, the 3D map from vehicle 12 may be provided to vehicle 14 via satellite 16. In other embodiments, the 3D map from vehicle 12 may be uploaded to an earth-bound central collector via radio frequency signals and downloaded from the collector to vehicle 14 via radio frequency signals. Alternatively, the 3D map from vehicle 12 may be transferred to vehicle 14 via an electrical conductor. In yet another embodiment, the 3D map from vehicle 12 may be stored on a memory device and subsequently installed in vehicle 14.

Next, in step 510, the second mobile unit is used to map the two-dimensional features while the second mobile unit traverses the surface. In the embodiment of FIG. 1, vehicle 14 includes an intensity field sensor 120 for mapping the two-dimensional features of roadway 217 to thereby create a map similar to the map shown in FIG. 2*a* while vehicle 14 travels over roadway 217.

In a final step 512, three-dimensional positions of the two-dimensional features mapped by the second mobile unit are determined within the second mobile unit and by using the three-dimensional map. For example, processor 122 of vehicle 14 may match up the two-dimensional features that vehicle 14 mapped with the two-dimensional features included in the three-dimensional map as received. Such matching may be performed utilizing edge detection or some other image processing algorithm. After finding a corresponding two-dimensional feature in the three-dimensional map, vehicle 14 may use the three-dimensional position of the matching 2D feature, as provided in the three-dimensional map, as a proxy for the three-dimensional position of the matching 2D feature mapped by vehicle 14.

Figure 6:
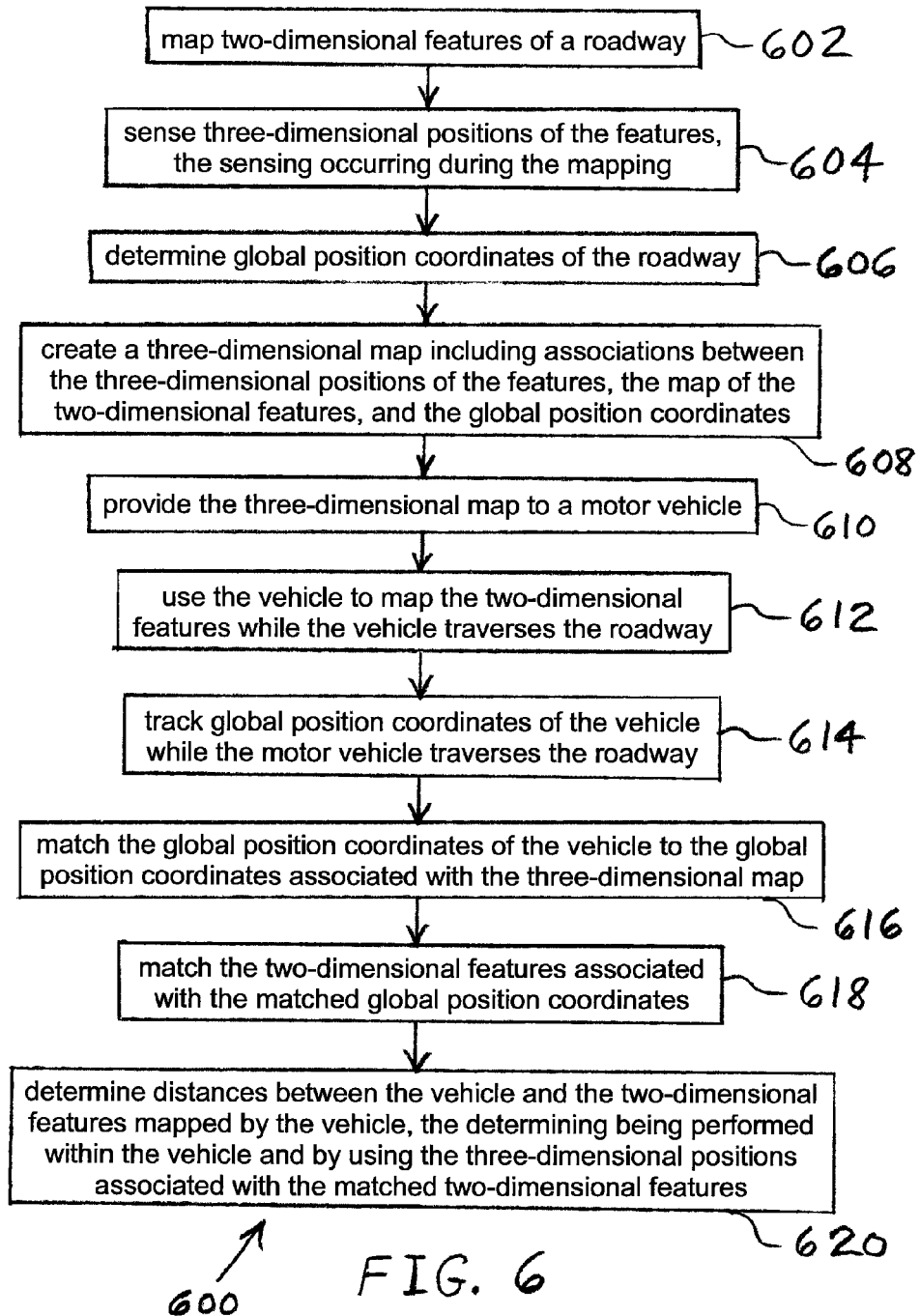
FIG. 6 is a flow chart of another embodiment of a mapping method of the present invention.

Another embodiment of a mapping method 600 of the present invention is illustrated in FIG. 6. In a first step 602, two-dimensional features of a roadway are mapped. For example, a vehicle 12 (FIG. 1) may include an intensity field sensor 20 that maps the two-dimensional features shown in FIG. 2*a* while vehicle 12 traverses a roadway 217.

In a second step 604, three-dimensional positions of the features are sensed during the mapping. For example, vehicle 12 may include a three-dimensional sensor such as 3D sensor 18, and this 3D sensor 18 may sense the distances between the features and vehicle 12 during the mapping performed by intensity field sensor 20.

In step 606, global position coordinates of the roadway are determined. For example, vehicle 12 may include a GPS module 26 that continually tracks its global position coordinates via communication between GPS module 26 and satellite 16 or between GPS module 26 and a dedicated GPS satellite.

In a next step 608, a three-dimensional map is created including associations between the three-dimensional positions of the features, the map of the two-dimensional features, and the global position coordinates. For example, a three-dimensional map such as shown in FIG. 2*b* may be created, and the mapping may include stored associations between each of the data points 228, respective points on the two-dimensional map of FIG. 2*a*, and the GPS coordinates of the points. For example, the three-dimensional position of data point 228₁ in the three-dimensional map of FIG. 2*b* may be stored in association with point 228₂ of the two-dimensional map of FIG. 2*a*, and with the single set of GPS coordinates associated with points 228₁, 228₂ as determined by GPS module 26.

Next, in step 610, the three-dimensional map is provided to a motor vehicle. For example, as shown in FIG. 1, the 3D map from vehicle 12 may be provided to vehicle 14 via satellite 16. In other embodiments, the 3D map from vehicle 12 may be uploaded to an earth-bound central collector via radio frequency signals and downloaded from the collector to vehicle 14 via radio frequency signals. Alternatively, the 3D map from vehicle 12 may be transferred to vehicle 14 via an electrical conductor. In yet another embodiment, the 3D map from vehicle 12 may be stored on a memory device and subsequently installed in vehicle 14.

In a next step 612, the vehicle is used to map the two-dimensional features while the vehicle traverses the roadway. In the embodiment of FIG. 1, vehicle 14 includes an intensity field sensor 120 for mapping the two-dimensional features of roadway 217 to thereby create a map similar to the map shown in FIG. 2*a* while vehicle 14 travels over roadway 217.

Next, in step 614, global position coordinates of the vehicle are tracked while the motor vehicle traverses the roadway. That is, vehicle 14 may include a GPS module 126 that continually tracks its global position coordinates via communication between GPS module 126 and satellite 16, or between GPS module 126 and a dedicated GPS satellite, while vehicle 14 travels along roadway 217.

In a next step 616, the global position coordinates of the vehicle are matched to the global position coordinates associated with the three-dimensional map. For example, a portion of the received three-dimensional map associated with GPS global coordinates that match or approximate the current GPS coordinates of vehicle 14 may be identified.

In step 618, the two-dimensional features associated with the matched global position coordinates are matched. That is, the portion of the received three-dimensional map associated with the current GPS global coordinates of vehicle 14 may include two-dimensional features that are also currently mapped by intensity field sensor 120 of vehicle 14. These two-dimensional features that are both in the three-dimensional map and currently mapped by intensity field sensor 120 may be matched together by processor 122 via pattern matching, edge detection, or some other image processing algorithm.

In a final step 620, distances between the vehicle and the two-dimensional features mapped by the vehicle are determined within the vehicle and by using the three-dimensional positions associated with the matched two-dimensional features. For example, after finding a corresponding two-dimensional feature in the three-dimensional map, vehicle 14 may use the three-dimensional position of the matching two-dimensional feature, as provided in the three-dimensional map, as a proxy for the three-dimensional position of the matching two-dimensional feature mapped by vehicle 14. The three-dimensional position of the matching two-dimensional feature may be expressed in the 3D map in terms of distance between vehicle 12 and the 2D feature. Thus, vehicle 14 may use this distance between vehicle 12 and the 2D feature as a proxy for the current distance between vehicle 14 and the 2D feature.

The present invention has been described herein primarily in connection with mapping by motor vehicles traveling on roadways. However, it is to be understood that the present invention is applicable to all products in the areas of driver assistance autonomous driving, robotics, mapping, and three-dimensional localization.

While this invention has been described as having an exemplary design, the present invention may be further modified within the spirit and scope of this disclosure. This application is therefore intended to cover any variations, uses, or adaptations of the invention using its general principles.

What is claimed is:

1. A mapping method, comprising:
using a first mobile unit to map two-dimensional features while the first mobile unit traverses a surface;
sensing three-dimensional positions of the features, the sensing occurring during the mapping;
creating a three-dimensional map including associations between the three-dimensional positions of the features and the map of the two-dimensional features;
providing the three-dimensional map from the first mobile unit to a second mobile unit;
using the second mobile unit to map the two-dimensional features while the second mobile unit traverses the surface; and
determining three-dimensional positions of the two-dimensional features mapped by the second mobile unit, the determining being performed within the second mobile unit and by matching up the two-dimensional features mapped by the second mobile unit with two-dimensional features included in the three-dimensional map.

2. The method of claim 1 wherein a first intensity field sensor is used to map the two-dimensional features while the first mobile unit traverses the surface, and a second intensity field sensor is used to map the two-dimensional features while the second mobile unit traverses the surface.

3. The method of claim 1 wherein the three-dimensional positions of the features are sensed by one of LIDAR and a stereo camera.

4. The method of claim 1 comprising the further steps of:
tracking global position coordinates of the first mobile unit while the first mobile unit traverses the surface, the three-dimensional map including associations between the three-dimensional positions of the features, the map of the two-dimensional features, and the global position coordinates of the first mobile unit; and
tracking global position coordinates of the second mobile unit while the second mobile unit traverses the surface, the determining step including matching the global position coordinates of the first and second mobile units.

5. The method of claim 4 wherein the determining step includes matching the mapped two-dimensional features associated with the matched global position coordinates.

6. The method of claim 1 wherein the three-dimensional map is provided from the first mobile unit to the second mobile unit via radio frequency signals.

7. The method of claim 1 wherein the second mobile unit does not sense three-dimensional positions of the features.

8. A mapping arrangement, comprising:
a first mobile unit including:
a first intensity field sensor configured to map two-dimensional features while the first mobile unit traverses a surface;
a three-dimensional position sensing device configured to sense the three-dimensional positions of the features during the mapping by the intensity field sensor;
a processor in communication with both the first intensity field sensor and the three-dimensional position sensing device, the processor being configured to create a three-dimensional map including associations between the three-dimensional positions of the features and the map of the two-dimensional features; and
a transmitting device in communication with the processor and configured to transmit the three-dimensional map; and
a second mobile unit including:
a receiving device configured to receive the three-dimensional map from the first mobile unit;
a second intensity field sensor configured to map the two-dimensional features while the second mobile unit traverses the surface; and
a processor in communication with both the second intensity field sensor and the receiving device, the processor being configured to determine three-dimensional positions of the two-dimensional features mapped by the second intensity field sensor, the determining being performed by matching up the two-dimensional features mapped by the second mobile unit with two-dimensional features included in the three-dimensional map.

9. The arrangement of claim 8 wherein the first mobile unit further includes a first GPS module configured to track global position coordinates of the second mobile unit, and the first mobile unit further includes a second GPS module configured to track global position coordinates of the second mobile unit, and wherein the processor of the second mobile unit is configured to use current global position coordinates of the second mobile unit to identify a corresponding portion of the three-dimensional map.

10. The arrangement of claim 8 wherein the three-dimensional position sensing device comprises one of LIDAR and a stereo camera.

11. The arrangement of claim 8, wherein each of the first and second mobile units comprises one of a lawn mower and a vacuum cleaner.

12. The arrangement of claim 8 wherein the transmitting device comprises one of a radio frequency transmitting device, an electrical conductor, and a memory device transferable from the first mobile unit to the second mobile unit.

13. The arrangement of claim 8 wherein the three-dimensional map comprises a three-dimensional surface mesh.

14. The arrangement of claim 8 wherein the second mobile unit lacks a three-dimensional position sensing device.

15. A mapping method, comprising:
mapping two-dimensional features of a roadway;
sensing three-dimensional positions of the features, the sensing occurring during the mapping;
determining global position coordinates of the roadway;
creating a three-dimensional map including associations between the three-dimensional positions of the features, the map of the two-dimensional features, and the global position coordinates;
providing the three-dimensional map to a motor vehicle;
using the vehicle to map the two-dimensional features while the vehicle traverses the roadway and without sensing the three-dimensional positions of the features;
tracking global position coordinates of the vehicle while the motor vehicle traverses the roadway;
matching the global position coordinates of the vehicle to the global position coordinates associated with the three-dimensional map;
matching the two-dimensional features associated with the matched global position coordinates; and
determining distances between the vehicle and the two-dimensional features mapped by the vehicle, the determining being performed within the vehicle and by using the three-dimensional positions associated with the matched two-dimensional features.

16. The method of claim 15 wherein the mapping, sensing and creating steps, and the step of determining global position coordinates, are performed within a first motor vehicle, the motor vehicle to which the three-dimensional map is provided comprising a second motor vehicle.

17. The method of claim 16 wherein a first intensity field sensor is used to map the two-dimensional features while the first vehicle traverses the roadway, and a second intensity field sensor is used to map the two-dimensional features while the second vehicle traverses the roadway.

18. The method of claim 15 wherein the determining is performed by matching up the two-dimensional features mapped by the second intensity field sensor with two-dimensional features included in the three-dimensional map.

19. The method of claim 16 wherein the three-dimensional map is provided from the first vehicle to the second vehicle.

20. The method of claim 15 wherein the three-dimensional positions of the features are sensed by one of LIDAR and a stereo camera.

* * * * *